US012569383B2

(12) United States Patent
Sanders

(10) Patent No.: US 12,569,383 B2
(45) Date of Patent: Mar. 10, 2026

(54) PORTABLE, ADJUSTABLE WHEELCHAIR-MOUNTED TABLE/DESK

(71) Applicant: Kenneth T Sanders, Griffin, GA (US)

(72) Inventor: Kenneth T Sanders, Griffin, GA (US)

( * ) Notice: Subject to any disclaimer, the term of this patent is extended or adjusted under 35 U.S.C. 154(b) by 434 days.

(21) Appl. No.: 18/373,189

(22) Filed: Sep. 26, 2023

(65) Prior Publication Data

US 2025/0099311 A1 Mar. 27, 2025

(51) Int. Cl.
*A61G 5/10* (2006.01)

(52) U.S. Cl.
CPC .................................. *A61G 5/1094* (2016.11)

(58) Field of Classification Search
CPC .............................. A61G 5/1094; A47B 83/02
See application file for complete search history.

(56) References Cited

U.S. PATENT DOCUMENTS

| | | | | | |
|---|---|---|---|---|---|
| 3,475,052 | A * | 10/1969 | Kaposi | A47B 23/02 248/456 |
| 4,659,099 | A * | 4/1987 | Malone | A61G 5/1094 5/507.1 |
| 5,842,745 | A * | 12/1998 | Kelly | A61G 5/1054 297/466 |
| 6,722,681 | B1 * | 4/2004 | Large | A61G 5/10 297/150 |
| 6,739,653 | B1 | 5/2004 | Hoekstra et al. | |
| 7,823,520 | B2 | 11/2010 | Mayben | |
| 10,321,769 | B2 * | 6/2019 | Longenecker | A47D 1/006 |
| 2006/0032417 | A1 | 2/2006 | Goschy et al. | |
| 2007/0114755 | A1 | 5/2007 | Pasternak et al. | |

FOREIGN PATENT DOCUMENTS

| | | | | | |
|---|---|---|---|---|---|
| GB | 2418349 | A * | 3/2006 | A47C 7/70 |
| KR | 20120032857 | A * | 4/2012 | A47C 7/705 |
| KR | 20220122082 | A * | 9/2022 | A61G 5/1094 |

* cited by examiner

*Primary Examiner* — Drew J Brown
(74) *Attorney, Agent, or Firm* — JT Holin, Attorney at Law, P.C.; James T. Hollin, Jr.

(57) ABSTRACT

Disclosed is a portable, adjustable table/desk configured to be removably attached to a wheelchair. The table/desk is utilized by an occupant of the wheelchair for engaging in paperwork, reading, or other activity. A variably tiltable tray is supported by parallel left and right side-panels and a rectangular, two-unit base plate 3. The undersurface of the tray 11 supports a linear, tube, each end embedded within countersunk hubs on the side-panels. The base plate 3 may be laterally widened or narrowed to correspond to accommodate the widths of various wheelchairs. Left and right chair mounts may be attached to the respective side-panels to facilitate direct attachment to suitable structural parts of wheelchairs not equipped with armrests. Alternatively, the left and right side-panels of the tray/desk may be attached to pliable left and right canopy clamps which flexibly grip the left and right armrests, respectively, of a wheel chair so equipped.

12 Claims, 8 Drawing Sheets

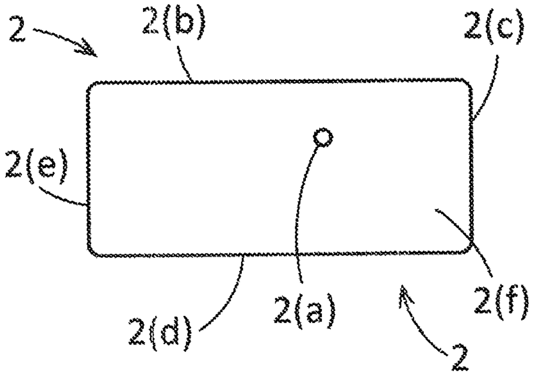
FIG. 10A
FIG. 9B
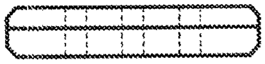
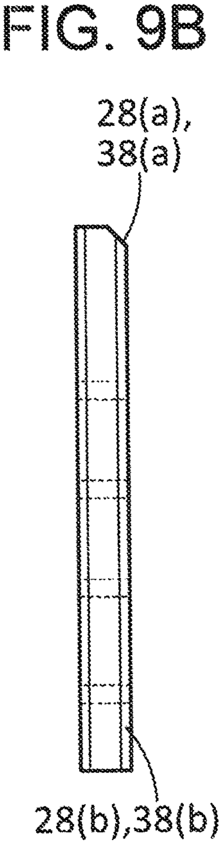
FIG. 9A
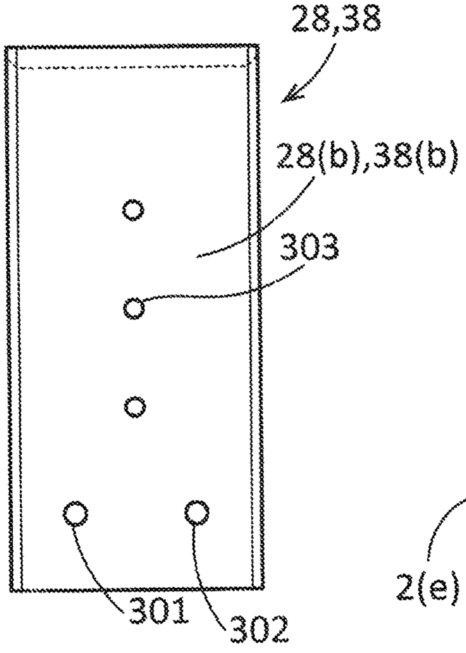
FIG. 9
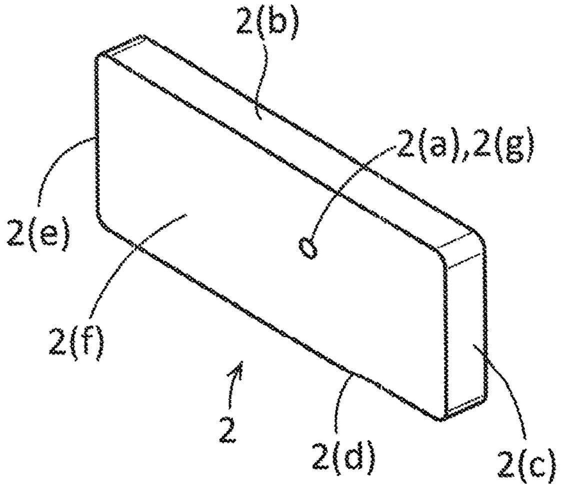
FIG. 10

PORTABLE, ADJUSTABLE WHEELCHAIR-MOUNTED TABLE/DESK

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The disclosed inventive concept generally relates to portable and adjustable work surfaces, desks, tables, and/or platforms which may be efficiently used by a physically impaired person. In particular, this disclosure pertains to portable work stations, desks, etc., which enable a person to operate and benefit from the use of the table/desk while occupying his/her wheelchair.

(2) Description of the Related Art, Including Information Disclosed Under 37 CFR 1.97 and 1.98

U.S. Published Patent Application 2006/0032417A1; Goschy et al; 16 Feb. 2006; A tabletop which is effectively easily retrofittable onto a wheelchair without any drilling or welding. The design can support an electronic device for computer-assisted living or simply provide a worksurface for reading or eating. The tabletop assembly is stabilized by an adjustable support structure. A mounting clamp may be provided to mount to the frame of the wheelchair, or a welded mounting tube can be provided which attaches onto the wheelchair footrest. The tabletop can be used in tandem with an optional horizontal panel which is mounted over the tabletop and top-hat brackets to support items such as an electronic device or a beverage. Alternatively, the tabletop can include a control panel which includes, for example, one or more pushbuttons, joy sticks and/or trackballs.

U.S. Pat. No. 7,823,520 B2; Mayben, R. 2 Nov. 2010; A portable, detachable desk or table extension is disclosed for use by a person in a wheelchair that may be vertically and angularly adjusted to an optimum height and position for use. The extension has a portable work surface or platform that extends out, away from, and above the surface of the desk or table to which it is attached, so that a user in a wheelchair may pull up to and under it and not be blocked or hindered by the table or desk underneath. The elevation as well as the angle of tilt of the platform may be adjusted for optimum positioning so that the user in a wheelchair may pull up close to and under it. The extension clamps to the table via a pair of vertical Supports that collapse down onto the platform for storage.

U.S. Published Patent Application #2007/0114755 A1; Pasternak, et al; 24 May 2007. A wheelchair having attachments configured for removable attachment to a wheelchair to facilitate use of the wheelchair by occupants and/or attendants. One attachment is a retract able tray spanning the armrests at the front of the chair when deployed and retracting between the chair structure and a wheel for storage. Another attachment is a series of inter changeably installable handgrips or handles removably installable to the front or back of the chair for use by an attendant. At least Some of the various handgrips or handle assemblies provide horizontal and/or vertical adjustment. Yet another attachment is an underseat storage compartment, primarily accessible by an attendant from the back of the chair. All of the various attachments may be installed upon and/or used with a wheelchair independently of one another or in combination with one another, or may be adapted for use with other devices as well.

U.S. Pat. No. 6,739,653B1; Hoekstra et al; 25 May 2004. An attachable and detachable wheelchair tray with an adjustable work surface is disclosed. The adjustable work surface has two parts connected with a hinge. Part one is a horizontal stationary supporting base and part two is a movable top portion which can be tilted in an angular range of from 90 degrees to 180 degrees in relationship to the horizontal base. There is also an extendible auxiliary supporting rack attached to the movable top portion that allows the user to enlarge or reduce the work surface, thus permitting access to more items, references publications at a time. All adjustments of the work surface are easily controlled with levers, buttons or foot pedals, called "Ergo Aids" which are located on or in close proximity to the wheelchair tray, in a place that is most convenient for the seated user. Fluid piston cylinders using compressed air, carbon dioxide or nitrogen provide the power required to move and adjust the tray with minimal force being applied to each control adjustments to a work surface that were previously very difficult for persons with limited manual dexterity are now easily made because the Ergo Aids require motions that are well within the ability of a seated user.

(3) Background Information

The field of the present inventive concept relates generally to portable, adjustable work surfaces, the same also providing accommodation for taking meals. In particular the type of devices for use by physically impaired youth and adults who are normally confined to wheelchairs. Many persons having physical impairments spend a good deal of their life in wheelchairs. Though there have been advancements in wheelchair design and technology, many wheelchairs are still overly-large and cumbersome to operate and accommodate the impaired person's needs.

The height of a typical dining table or office desk is normally too low to allow a wheelchair and its occupant to fit under it. As a result, it is often difficult for the occupant of a wheelchair to comfortably wheel up to, and under, the table or desk to accomplish his/her needs. It would be undeniably beneficial to design and provide a portable desk and/or table which would be attachable/removable from the wheelchair

BRIEF SUMMARY OF THE INVENTIVE CONCEPT

The disclosed inventive concept is referred to as a portable table/desk 1 that is intended for use by a person in a wheelchair. The table/desk 1 surface may be angularly adjusted to an optimum height, slope, and position for use. Further the table/desk 1 is constructed with components which allow width-wise adjustments to accommodate the left-to-right lateral space or dimensions of a particular make or type of wheelchair.

The inventive concept is for the purpose of providing a removable, adjustable workspace to a wheelchair. The table/desk 1 may be utilized by an occupant of a wheelchair for engaging in paperwork, reading, or enjoying a meal. A tiltable tray 11 is supported by a rectangular base plate 3, comprising two-units: a slidable Tee 44 and a receptor plate 41. The Tee 44 and receptor plate 41 may be adjusted in and out, laterally, to narrow or widen the spacing between left and right side-panels 24, 34

The user, or a caregiver, may adjust the closeness of the table/desk 1 for his/her own comfort, such that the user will not be blocked or hindered by the table/desk 1 being uncomfortably close. The slope and angle of tilt of the table/desk 1 may be adjusted for optimum positioning so that the user in a wheelchair may conveniently reach objects resting on top of the table/desk 1. In one embodiment, the table/desk 1 contains appropriate clamps for attachment to the left and right armrests of a wheelchair, respectively. For smaller wheelchairs having no armrests, the table/desk 1 is constructed with identical right and left chair mounts 21, 31 for securement to appropriate structural components on the left and right sides of a wheel chair.

When not in use, the table/desk 1 may be detached from the wheelchair, compacted, and stowed in a convenient location. The table/desk 1 may be constructed of wood, metal, fiberglass, plastic, PVC, or other suitable material.

BRIEF DESCRIPTION OF THE VIEWS OF DRAWINGS AS EXEMPLARY EMBODIMENTS OF THE INVENTIVE CONCEPT

FIG. 1 illustrates a perspective view of generally the right side of the table/desk 1, further showing a right side-panel 24, right chair mount 21, the inside surfaces of a left chair mount 31 and left side-panel 34, a base plate 3, a tray 11, a cylindrical shaft assembly 4, and an angle adjuster 2, the right side-panel and left side-panel being parallel to each other.

FIG. 2 displays a perspective view of the table/desk 1 of FIG. 1, having been placed in an inverted position. Shown in FIG. 2 are the base plate 3, base plate undersurface 3(*b*), the left side-panel 24 and corresponding left chair mount 21, the right side-panel 34 and corresponding right chair mount 31, the cylindrical shaft assembly 4, and left and right saddles 7 for mounting and attachment to a wheelchair.

FIG. 3 depicts a view of the right side of an embodiment of the table/desk 1, further showing the right edge of the tray 11 and the angle adjuster 2. The base plate 3 (shown by dashed lines) is shown attached to the right side-panel 24. A right canopy clamp 30 is shown attached to the right side-panel 24.

FIG. 3A shows a stand-alone view of a right canopy clamp 30, showing its length wise top surface cap 30(*c*), the right straight interior segment 30(*a*), and the right bent segment 30(*b*) of the right canopy clamp 30.

Figure 3:
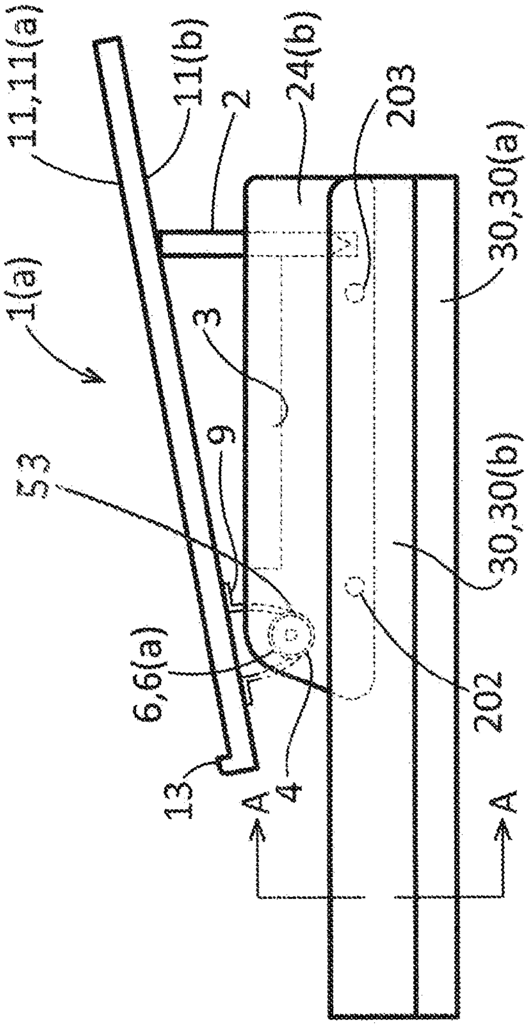
FIG. 3B illustrates a cross-sectional view of the right canopy clamp 30, attached to the right side-panel 24, as seen from the perspective of section line A-A of FIG. 3.
FIG. 3C illustrates a cross-sectional view of the left canopy clamp 40, attached to the left side-panel 34, as seen from the perspective of section line B-B of FIG. 6.
Figure 3A:
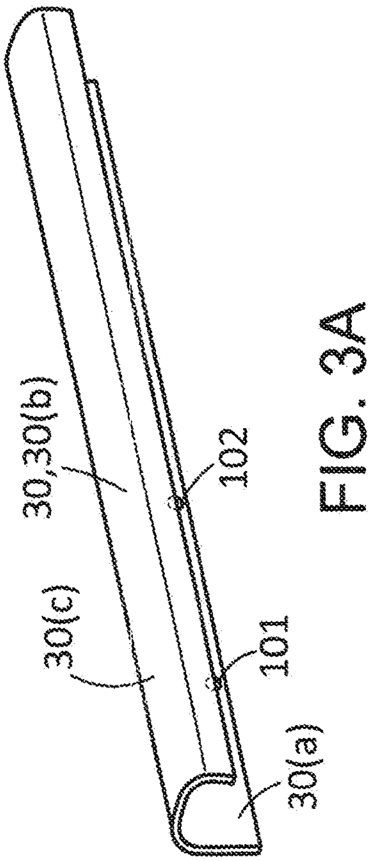
Figure 3D:
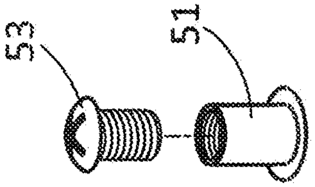

FIG. 3D depicts a type of fastening system, being a binding barrel 51 and flathead machine screw 53, may be used to fasten both the left and right canopy clamps 40, 30 to their respective side-panels 34, 24, and other types of connections.

Figure 4A:
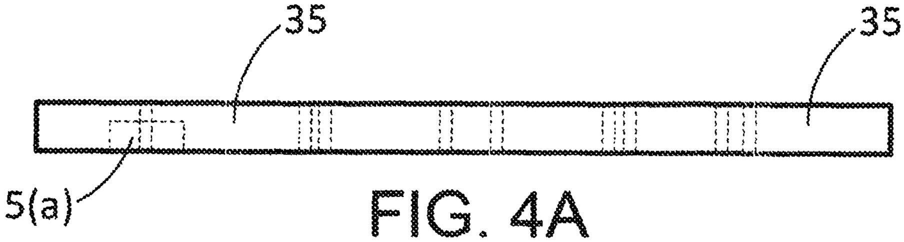
Figure 4:
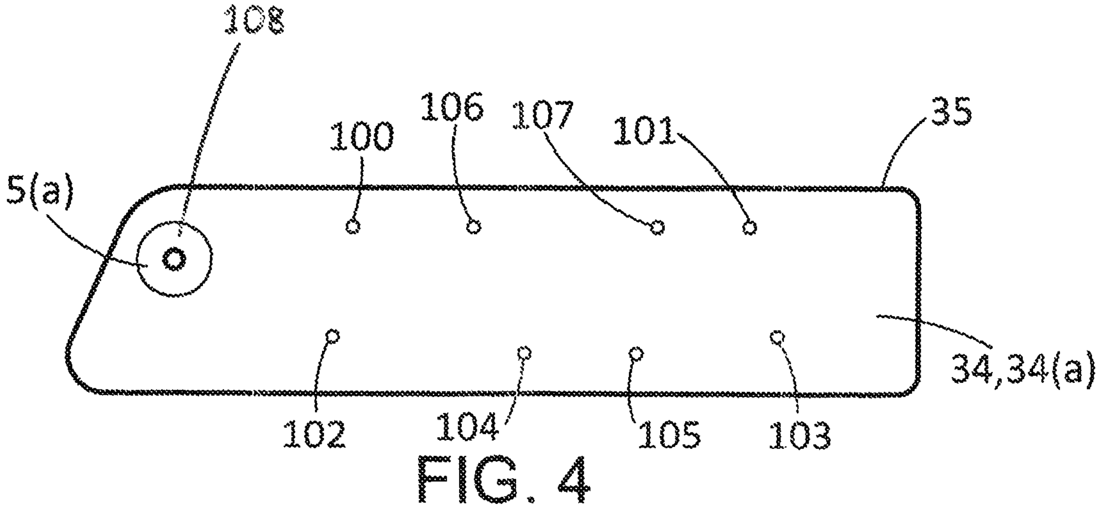

FIG. 4 is a view of the inner surface 34(*a*) of the left side-panel 34, a primary vertical support component of the table/desk 1, further showing the left countersunk hub 5(*a*) and several orifices for any necessary fasteners to connect various components.

FIG. 4A displays a view of the upper edge 35 of the left side-panel 34 of FIG. 4, including the route of orifices.

Figure 5A:
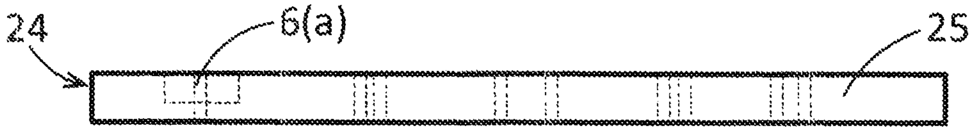
Figure 5:
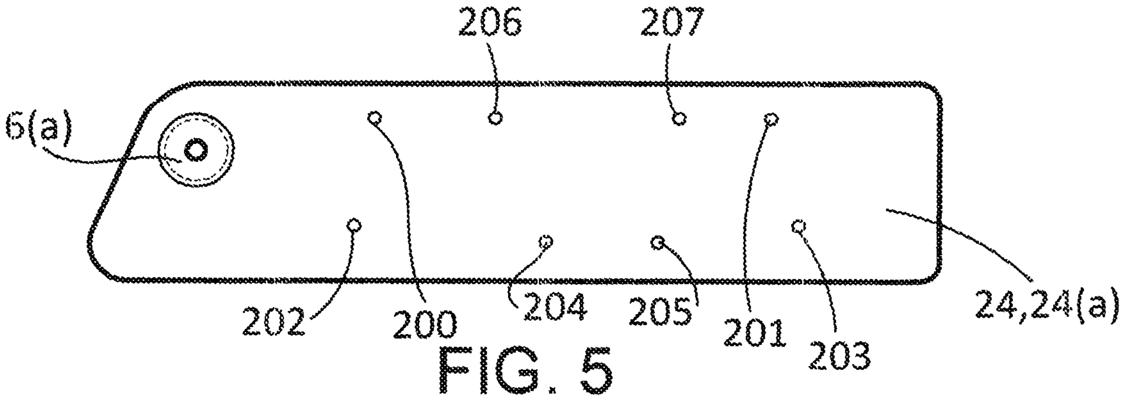

FIG. 5 displays a view of the inner surface of the right side-panel 24, a vertical support component of the table/desk 1, dashed lines showing the right countersunk hub 6(*a*) and the location of orifices for fasteners to connect components.

FIG. 5A displays a view of the upper edge 25 of the right side-panel 24 of FIG. 5, further showing the right countersunk hub 6(*a*) and the location of various orifices.

Figure 6:
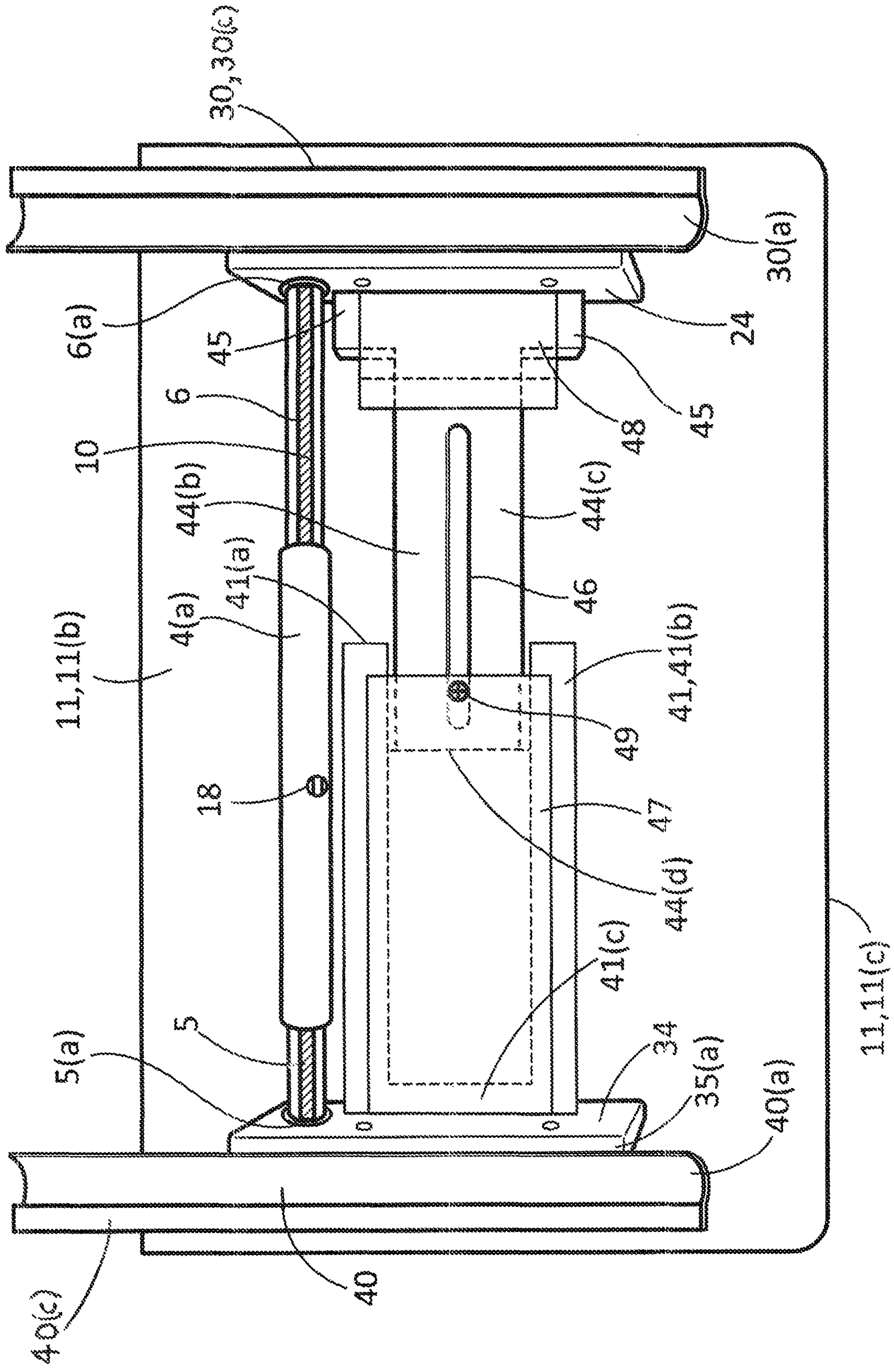

FIG. 6 shows the layout of the bottom surfaces and components of an embodiment enabling attachment of the table/desk 1 to the armrests of a wheelchair so equipped.

Figure 7:
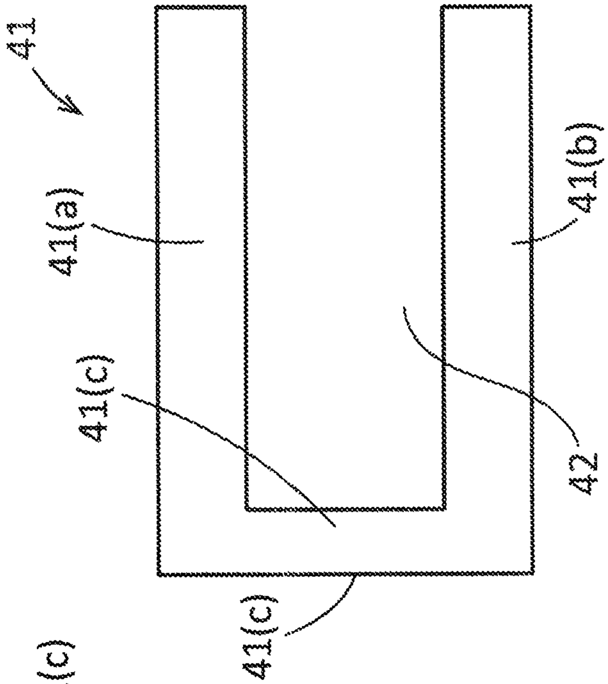

FIG. 7 is a stand-alone view of a plate receptor 41 component of the base plate 3, showing its left leg 41(*a*), right leg 41(*b*), receptor head 41(*c*), and a plate channel 42.

Figure 7A:
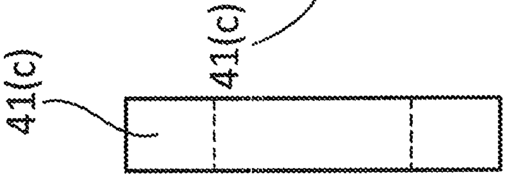

FIG. 7A is an end view of the plate receptor 41 showing the receptor head 41(*c*).

Figure 7B:
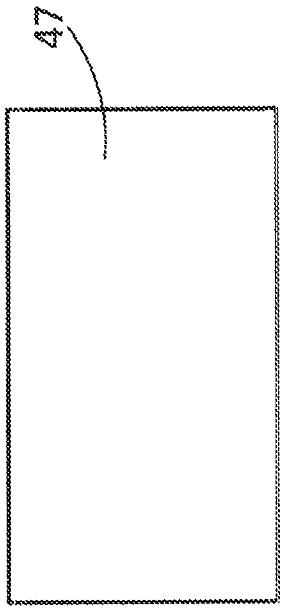

FIG. 7B shows the outer surface of a planar, large shield 47, functionally secured to the reception plate 41 for protection from inadvertent contact or foreign matter.

Figure 8:
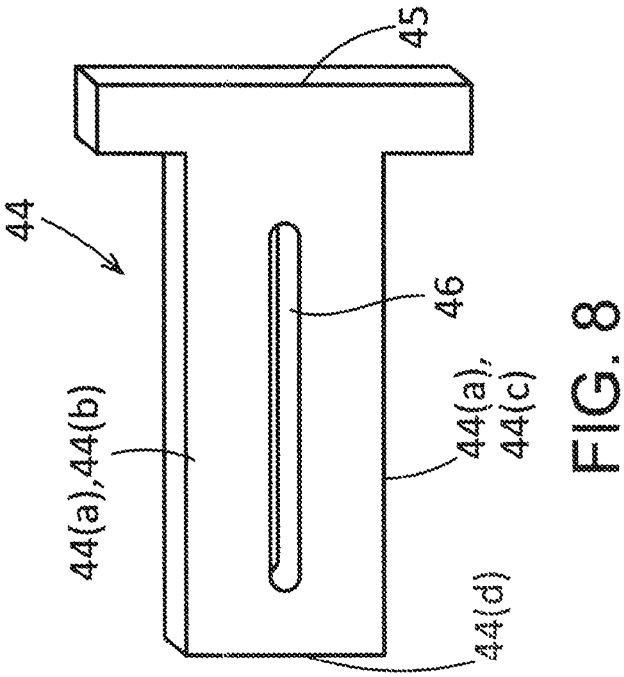

FIG. 8 presents a view of the upper surface of the Tee 44 component required in conjunction with the plate receptor 41. Shown are the Tee handle 45, Tee stem 44(*a*), left branch 44(*b*), right branch 44(*c*), a Tee slot 46, and the Tee end 46(*d*).

Figure 8A:
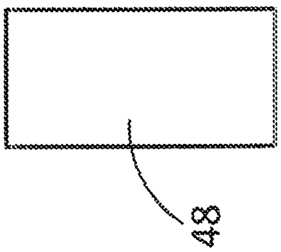

FIG. 8A is a planar view of the outer surface of a small shield 48 for securement to the upper segment of the Tee 44, as protection from inadvertent contact.

FIG. 9 presents a direct view of the outer surface 28(*b*) of a right vertical base 28 component that functions as either a right vertical brace 28 or left vertical brace 38.

FIG. 9A is a side view of the right/left vertical brace 28, 38, showing orifices for insertion of fasteners to connect either vertical brace 28, 38 to the side-panels 24, 34.

FIG. 9B is a view of the top surface of either right/left vertical brace 28, 38.

FIG. 10 illustrates a perspective view of the angle adjuster 2, used to position the tray 11 at varying tilts. The angle adjuster 2 is rotated about an axle 2(*a*) to place any of its perimetral edges 2(*b*), 2(*c*), (2(*d*), or 2(*e*) directly under the front of the tray 11.

FIG. 10A shows a direct planar view of the angle adjuster 2 and the perimetral edges relative positioning. Also shown is an off-center orifice to support the axle 2(*a*).

Figure 11:
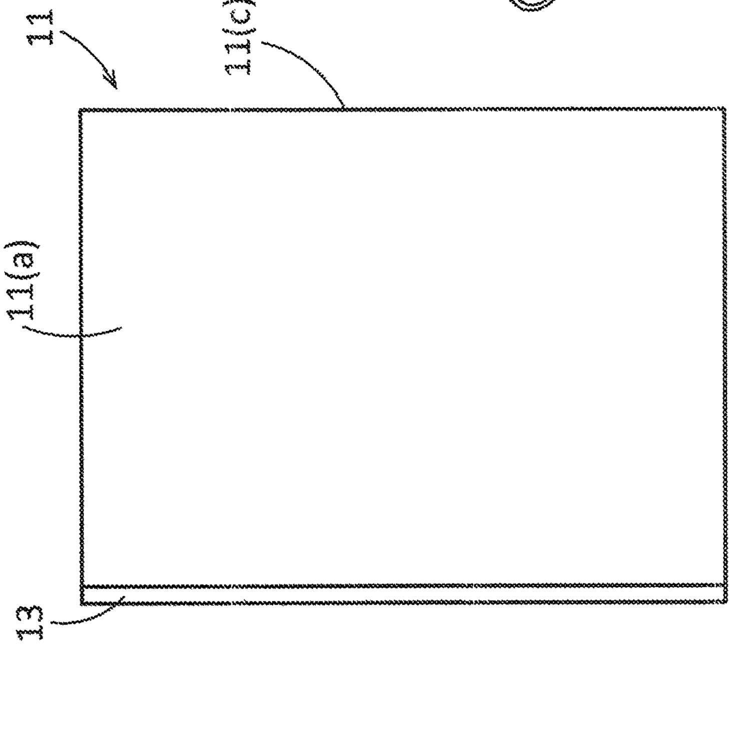

FIG. 11 presents a planar view of the top surface 11(*a*) of the tray 11, including its rearward-located flange 13.

Figure 11A:
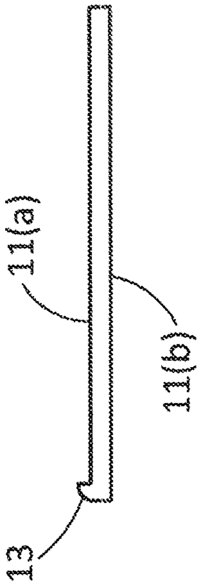

FIG. 11A is a profile view of the tray 11, also showing the tray top surface 11(*a*), undersurface 11(*b*), and flange 13.

Figure 12:
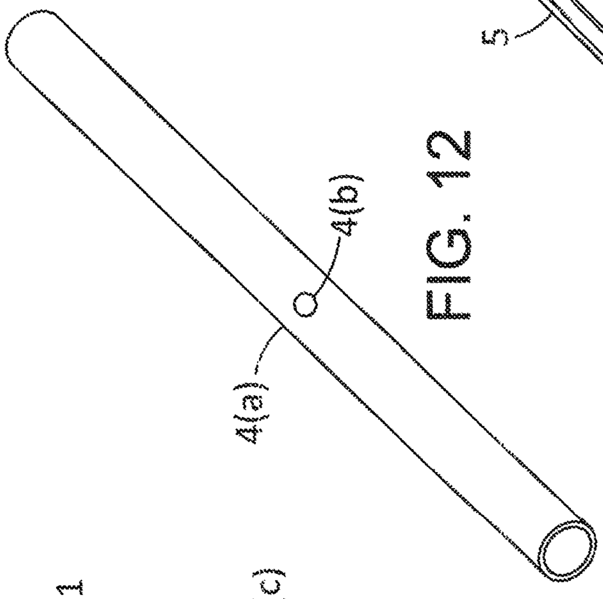

FIG. 12 shows the linear tube 4(*a*) component of the cylindrical shaft assembly 4, further showing an access hole 4(*b*) which permits insertion of a retaining fastener 18 to attach the tube 4(*a*) to the undersurface 11(*b*) of the tray 11.

Figure 12A:
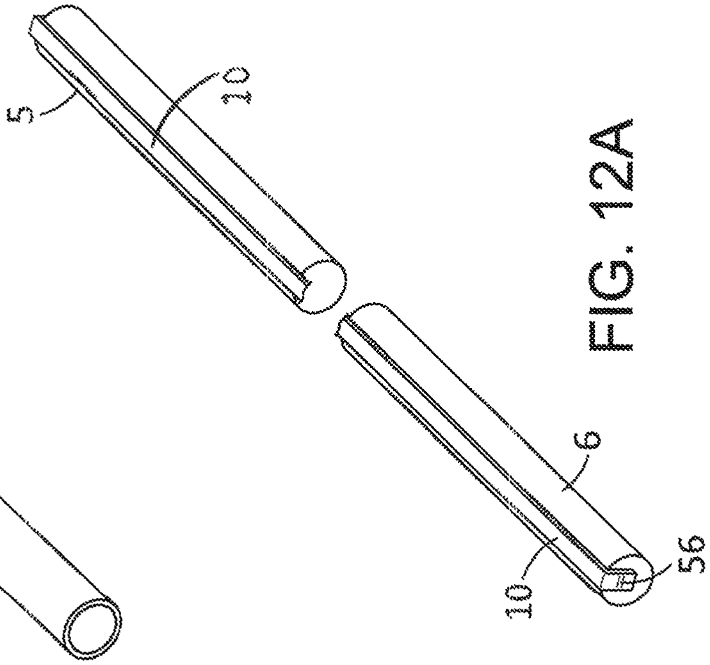

FIG. 12A presents a view of the left rod 5 and right rod 6, shown connected by a common elastic band 10, connected to each respective end of the rods 5, 6.

| Nomenclature & Part Numbers of Invention |
| --- |
| 1. Adjustable table/desk |
| 1(a) Clamping table/desk |
| 2. Angle adjuster |
| 2(a) Axle |
| 2(b) First perimetral edge |
| 2(c) Second perimetral edge |
| 2(d) Third perimetral edge |
| 2(e) Fourth perimetral edge |
| 2(f) Front surface |
| 2(g) Off-center orifice |
| 3. Base plate |
| 3(a) Base plate upper surface |
| 3(b) Plate undersurface |
| 4. Cylindrical shaft assembly |
| 4(a) Linear tube |
| 4(b) Access hole |
| 5. Left rod |
| 5(a) Left countersunk hub |
| 6. Right rod |
| 6(a) Right countersunk hub |
| 7. Saddle |
| 8. Flexible fastenable strap |
| 9. Tube retainer |
| 10. Elastic band |
| 11. Tray |
| 11(a) Tray top surface |
| 11(b) Tray undersurface |
| 11(c) Front edge |
| 12. Tray rear edge |
| 13. Flange |
| 14. Corner protector |
| 15. Stop-block |
| 16. Pivotal orifice |
| 17. Flexible cord |
| 18. Retaining fastener |
| 19. Through-hole |
| 20. n/a |
| 21. Right chair mount |
| 21(a) Upper edge |
| 21(b) Front edge |
| 21(c) Bottom edge |
| 21(d) Inside surface |
| 21(e) Outside surface |
| 22. Right extension arm |
| 23. Right flat |
| 24. Right side-panel |
| 24(a) Rt. side-panel interior wall |
| 24(b) Rt. side-panel exterior wall |
| 25. Rt. side-panel upper edge |
| 25(a) Rt. side-panel lower edge |
| 25(b) Rt. side-panel front edge |
| 25(c) Rt side panel rear edge |
| 26. Right fastener |
| 27. n/a |
| 28. Right vertical brace |
| 28(a) Outer surface |
| 29. Right molding |
| 30. Right canopy clamp |
| 30(a) Right straight interior |
| 30(b) Right bent segment |
| 30(c) Right cap |
| 30(d) Right straight exterior |
| 30(e) Right bent interior |
| 31. Left chair mount |
| 31(a) Upper edge |
| 31(b) Front edge |
| 31(c) Bottom edge |
| 31(d) Inside surface |
| 31(e) Outside surface |
| 32. Left extension arm |
| 33. Left flat |
| 34. Left side-panel |
| 34(a) Lt. side-panel interior wall |
| 34(b) Lt. side-panel exterior wall |
| 35. Lt. side-panel upper edge |
| 35(a) Lt. side-panel lower edge |
| 35(b) Lt side-panel front edge |
| 35(c) Lt side-panel rear edge |
| 36. Left fasteners |
| 37. n/a |
| 38. Left vertical brace |
| 38(a) Outer surface |
| 39. Left molding |
| 40. Left canopy clamp |
| 40(a) Left straight interior |
| 40(b) Left bent segment |
| 40(c) Left cap |
| 40(d) Left straight exterior |
| 40(e) Left bent interior |
| 41. Receptor plate |
| 41(a) Receptor left leg |
| 41(b) Receptor right leg |
| 41(c) Receptor head |
| 42. Plate channel |
| 43. n/a |
| 44. Tee |
| 44(a) Stem |
| 44(b) First branch |
| 44(c) Second branch |
| 44(d) Tee end |
| 45. Tee handle |
| 46. Slot |
| 47. Large shield (what function?) |
| 48. Small shield cover |
| 49. Guide screw |
| 50. n/a |
| 51. Binding barrel |
| 52. Bolt |
| 53. Machine screw |
| 54. Bolt |
| 55. Nut |
| 56.-99. n/a |
| 100, 101 Available orifices |
| 102, 103 Orifices to left canopy |
| 104, 105 Orifices to vertical brace |
| 106, 107 Orifices to base plate |
| 108. Orifice to left rod |
| 200, 201 Available orifices |
| 202, 203 Orifices to right canopy |
| 204, 205 Orifices to vertical brace |
| 206, 207 Orifices to base plate |
| 301.-303 Available orifices |

DETAILED DESCRIPTION OF THE INVENTION

The objects, features, and advantages of the inventive concept presented in this application are readily understood when referring to the accompanying drawings. The drawings, totaling twenty-three figures, show the basic components and functions of embodiments and/or methods of use. In the several figures, like reference numbers are used in each figure, corresponding to the same component as depicted in other figures.

The terminology used herein is for the purpose of describing particular embodiments only, and is not intended to limit different aspects or the concept of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
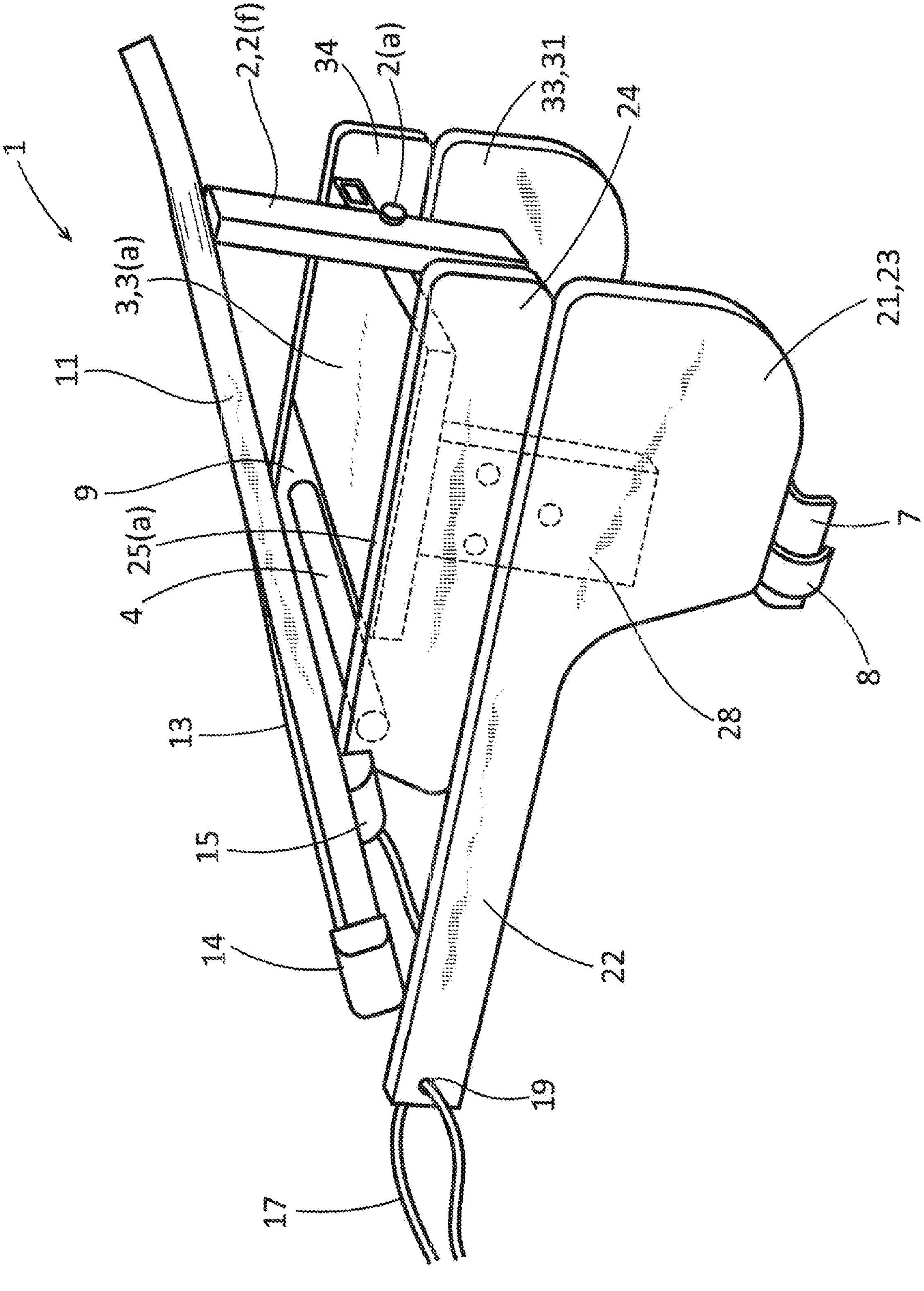

The discussion of the present inventive concept will be initiated with FIG. 1. In FIG. 1 there is shown a primary embodiment of the portable table/desk 1, which is designed and configured for temporary attachment to a wheelchair having no armrests. FIG. 1 illustrates a perspective view of generally the right side of the table/desk 1, further showing the right side-panel 24, right chair mount 21, the inside surfaces of the left chair mount 31 and left side-panel 34, the base plate 3, and the angle adjuster 2. The angle adjuster 2, a rectangular cuboid, is positioned to place the planar tray 11 in an upwardly-tilted orientation, if desired, relative to the top surfaces of the two side-panels, 24, 34.

The table/desk 1 embodiment of FIG. 1 is configured for mounting upon accessible, suitable left and right structural components of a wheelchair. This type of mounting is accomplished by a curvilinear saddle 7 and an accompanying flexible strap 8, as shown on the bottom of the right chair mount 21. An identical saddle 7 and strap 8 (out of view). also is configured on the bottom of the left chair mount 31.

For children's wheelchairs and wheelchairs having no armrests, the embodiment of the table/desk 1 in FIG. 1 is a necessary. The table/desk 1 of FIG. 1, constructed with identical right and left chair mounts 31, 21, provides a means of harnessing the two saddles 7 and straps 8 to accessible structural components of a wheelchair.

In FIG. 1, the tray 11 is shown positioned, by the angle adjuster 2, at an upward tilt of approximately twenty degrees. The angle adjuster 2 is rotatable to adjust the slope of the tray 11 from approximately horizontal to other positions corresponding to the abutting surface of the angle adjuster 2. A laterally-adjustable base plate 3 is affixed, at its left and right sides, to the left side-panel 34 and right side-panel 24, respectively.

Also shown in FIG. 1 is a flexible cord 17 for securing the rear ends of the extension arms 22, 32, to a suitable structural component of the particular wheelchair in use. The table/desk 1 may be placed in a "compacted mode" for stowage when the tray undersurface 11(*b*) is placed flush upon the upper edges 25, 35 of the right and left side-panels 24, 34 and the base plate 3 is compacted into its narrowest lateral dimension.

Figure 2:
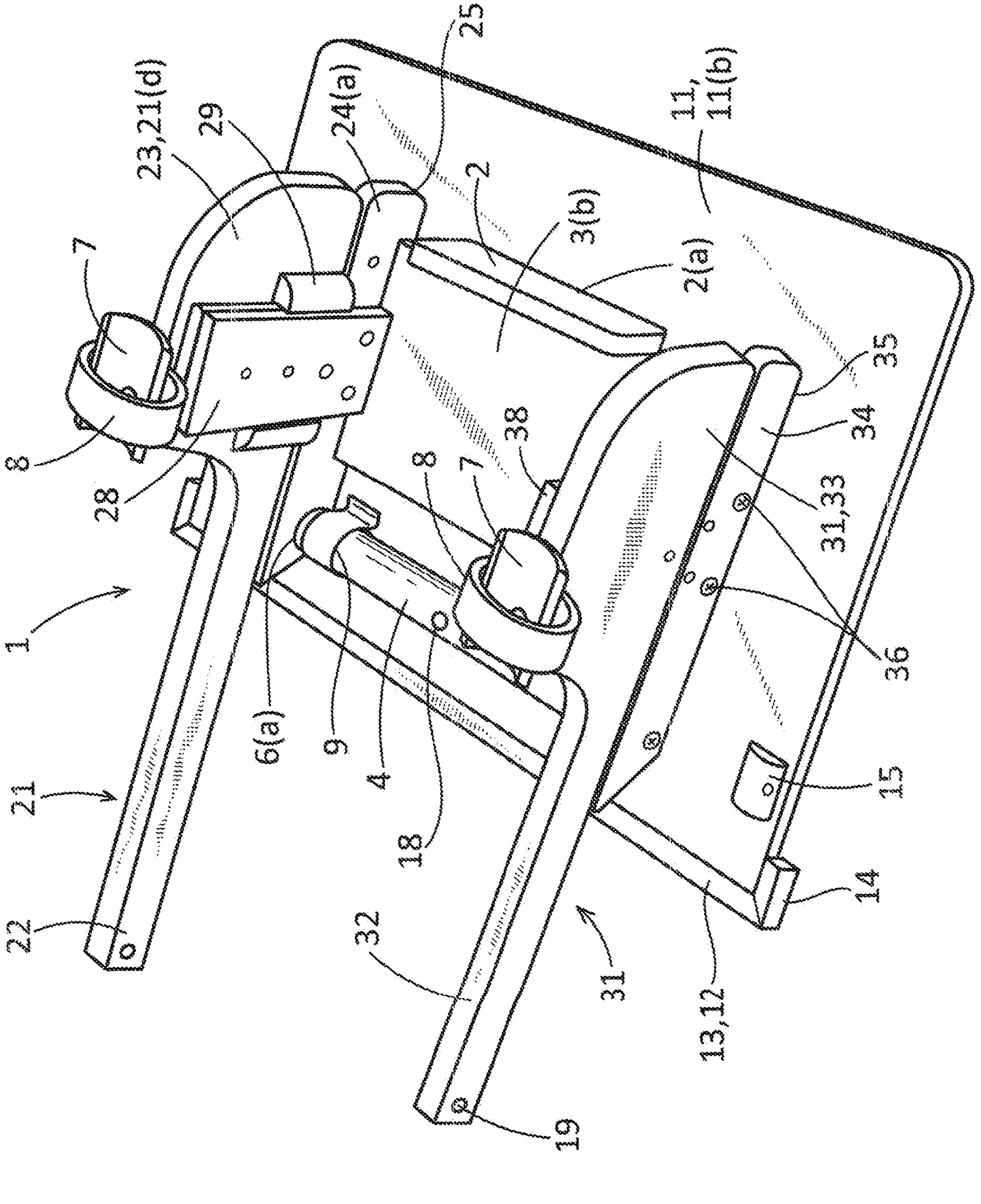

FIG. 2 displays a comprehensive view of the table/desk 1 having been placed in an inverted position. Prominently shown are the lower surface 3(*b*) of the base plate 3, and the left and right side-panels 34, 24, each coupled to its corresponding left or right chair mount 31, 21. Further shown are the two saddles 7 and attached straps 8, used to mount the bottoms of the flats 33, 23, of the left and right chair mounts 31, 21 onto at least one structural component of a wheel chair. The angle adjuster 2 is shown rotated to a position placing it parallel and in abutment to the undersurface 11(*b*) of the tray 11. The tray 11 is therefore shown flush with the upper edges of the two side-panels, 24, 34.

In order to mount the table/desk 1 to a wheelchair having no armrests, a user must utilize the components shown in FIG. 1 and FIG. 2. The right side-panel 24 and left side-panel 34 are the basic vertical components, but must be extended to enable their attachment to structural components of a wheelchair. Right and left chair mounts 21, 31 must be mounted to the right and left side-panels 24, 34, respectively. The chair mounts 21, 31, feature a "flat" 23, 33 segment, resembling the contour of a tennis racket. For clarity, this discussion will focus on the structure and function of the right chair mount 21, the left chair mount 31 being fabricated in an identical manner.

The right chair mount 21 is of the same thickness as the right side-panel 24, and has an upper edge 21(*a*), a front edge 21(*b*), bottom edge 21(*c*), an inside surface 21(*d*), an outside surface 21(*e*), an integral right extension arm 22, and a right flat 23. As shown in FIG. 2, the upper edge 21(*a*) of the right chair mount 21 abuts the right side-panel lower edge 25(*a*). Further, it is seen that a vertical 28 brace binds the inside surface 21(*d*) of the right chair mount 21 and the interior surface 24(*a*) of the right side-panel. This binding provides rigidity of vertical and sidewise support for the right side of the table/desk 1. The right side-panel 24 and left side-panel 34 are parallel to each other.

FIG. 1 and FIG. 2 further show that both extension arms 22, 32, of the right and left chair mounts 21, 31 extend, roughly the length of each side panel, past the rear edges 25(*c*), 35(*c*) of the side-panels 24, 34. A through-hole 19 at the end of each extension arm 22, 23 allows insertion of a flexible cord 17, to provide additional securing to a wheelchair. A semi-circular saddle 7 is attached to the bottom edge 21(*c*) of the right chair mount 21, along with a fastenable strap 8 bonded to the outer surface of the saddle 7. Since the right chair mount 21 extends further below the right side-panel 24, it serves as a mechanism to connect the right side of the table/desk 1 to an accessible structural component on the right side of a wheelchair. Similarly with the left chair mount 31.

Two moldings 29, in view in FIG. 2, serve to stabilize each vertical brace 28, 38, against the right flat 23 of the right chair mount 21 and the left flat 33 of the left chair mount 31, respectively. Each vertical brace 28, 38 is jointly attached to the inside surface of its respective chair mount 21, 31 and its corresponding side-panel 24, 34. A left stop-block 15 (right stop-block not in view) serves to limit the sidewise distance which either of the side-panels 24, 34 may be moved when the base plate 3 is expanded laterally.

The cylindrical shaft assembly 4, in the embodiment shown, is confined to the undersurface 11(*b*) of the tray 11 by two flexible tube retainers 9, and also a retaining fastener 18. The components of the cylindrical shaft assembly 4 are more clearly shown in FIGS. 12 and 12A. The right end of the cylindrical shaft assembly 4 is nestled within a circular countersunk hub 6(*a*) on the right side-panel 24, while the left end of the cylindrical shaft assembly 4 (not in view) is contained within a left countersunk hub 5(*a*) on the left side-panel 34. FIG. 3 and FIG. 6 provide a clearer presentation of the function of both countersunk hubs 5(*a*), 6(*a*).

A retaining fastener 18 is inserted through the linear tube 4(*a*) and anchored into the undersurface 11(*b*) of the tray 11. The binding of the cylindrical shaft assembly 4 by the retaining fastener 18 therefore causes the uniform rotation of both the left end right countersunk hubs 5(*a*), 6(*a*) about the respective left and right ends of the cylindrical shaft assembly 4 on those occasions when a user moves the tray 11 toward, or away from, abutment with the top edges of the right side-panel 24 and left side-panel 34.

FIG. 3 presents a view of the right side of a different embodiment of the table/desk 1, an embodiment suitable for attachment of the table/desk 1 to the armrests of a wheelchair so equipped. In view is the right edge of the tray 11, and the angle adjuster, 2, a rectangular cuboid, which has been oriented lengthwise vertically, establishing an upward tilt of the tray 11. Dashed lines depict the location of the right countersunk hub 6(*a*) which houses the right end of the cylindrical shaft assembly 4. A right rod 6, internal to the cylindrical shaft assembly 4, is affixed in the right countersunk hub 6(*a*) by a screw 53. The base plate 3 (also shown by dashed lines) is shown, fixedly attached to the interior wall 24(*a*) of the right side-panel 24.

FIG. 3 further depicts a right canopy clamp 30 attached to the exterior wall 24(*b*) of the right side-panel 24. The right canopy clamp 30 is made of a pliable, semi-rigid material and replaces the previously-described right chair mount 21. Similarly, a left canopy clamp 40 (not in view) is attached to the exterior wall 34(*b*) of the left side-panel 34. The embodiment of FIG. 3 enables mounting of the table/desk 1 on the armrests of a wheelchair. Dashed lines 202, 203 indicate the location of fasteners used to attach the right canopy clamp 30 to the right side-panel 24. In other embodiments, different construction materials enable these attachments to be made with adhesives or welds.

FIG. 3A presents a stand-alone view of the right canopy clamp 30, its lengthwise top surface referred to as a cap 30(*c*). The right, straight interior segment 30(*a*) of the right canopy clamp 30 is flat, to enable a flush fit against the exterior surface 24(*b*) of the right side-panel 24. The outward length of the right canopy clamp 30, referred to as the right bent segment 30(*b*), having an inward curvilinear bend.

Figure 3B:
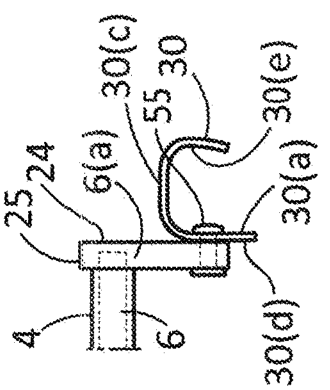

FIG. 3B shows a cross-sectional view of the right canopy clamp 30 as seen from the perspective of section line A-A of FIG. 3. As shown, the cross-section is comparable to the inverted letter "J." The cross-sectional profile shows the right, integral canopy cap 30(*c*) to be relatively flat the entire length of the canopy clamp 30. Attachment of the right canopy clamp 31 to the lower segment of the right side-panel 24 is accomplished by means of bolts 52, machine screws 53, nuts 55, and/or other suitable fastening means.

Figure 3C:
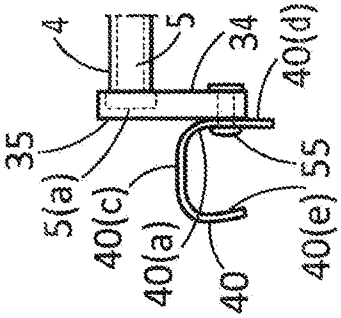

FIG. 3C is a cross-sectional view of the left canopy clamp 40 as seen from the perspective of section line B-B of FIG. 6. Moreover, FIG. 6 presents a more illustrative view of the table/desk 1, as configured with both canopy clamps 30, 40.

For securement of the embodiment of FIG. 3 to the armrest of a wheelchair, a user may begin by placing the left canopy clamp 40 parallel to, and atop the left armrest of the wheelchair, and the right canopy clamp 30 parallel to, and atop the right armrest. The user then exerts slight pressure upon the left bent segment 40(*b*) such that the left bent segment 40(*b*) is flexed outward, forcing it to encompass the entire contacted length of the left armrest of the wheelchair. The attachment is completed by following the same procedure with the right canopy clamp 30.

FIG. 3D depicts the type of fastening system, being a binding barrel 51 and flathead machine screw 53, which may be utilized to fasten the right and left canopy clamps 30, 40, to the right and left side-panels, respectively. Other types of fasteners, including adhesive, may also be utilized for fastening. Removable fasteners allow the interchange of the right and left canopy clamps 30, 40 and right and left chair mounts 21, 31, as necessary.

FIG. 4 displays a view of the interior wall 34(*a*) of the left side-panel 34, one of the two primary vertical support components of the table/desk 1. Prominently shown is the left countersunk hub 5(*a*), along with the locations of several orifices. Orifices 100, and 101 allow the insertion of fasteners for connection of the left side-panel 34 to the left side of the base plate 3, being the head 41(*c*) of the receptor plate 41. Two orifices, 102, 103, allow the connection of the left canopy clamp 40 (when used) to the exterior of the left side-panel 34. Orifice 108 is for insertion of a screw to fasten the left rod 5 within the left countersunk hub 5(*a*).

Orifices 104, 105, are used to connect the left side-panel 34 to the left vertical brace 38, in the event a left chair mount 31 must be used for mounting the table/desk 1. upon a specific left side structural component of a wheelchair. Further, orifices 106, 107 are a means of inserting fasteners to attach the left side-panel 34 to the receptor head 41(*c*) of the receptor plate 41, component of the base plate 3.

FIG. 4A displays a view of the upper edge 35 of the left side-panel 34, further showing the left countersunk hub 5(*a*) and the location of the various orifices enabling the connection of the left side-panel 34 to the base plate 3, a left vertical brace 38, or if necessary, connection to a left canopy clamp 40. The left countersunk hub 5(*a*) is the housing for the left end of the tube 4(*a*) and left rod 5 cylindrical shaft assembly 4.

FIG. 5 displays the interior surface 24(*a*) of the right side-panel 24. The right countersunk hub 6(*a*) is shown, along with the location of several orifices. Orifices 200, and 201 allow the insertion of fasteners for connection of the right side-panel 24 to the right side of the base plate 3, or the stem 44(*b*) of a Tee 44. Two orifices, 202, 203, allow fasteners to connect a right canopy clamp 30 (when used) to the exterior of the right side-panel 24. The left and right canopy clamps 40, 30 may be used for attachment of the table/desk 1 to a wheelchair having armrests.

Orifices 204, 205, serve to insert fasteners for connecting the right side-panel 24 to the right vertical brace 28 where a right chair mount 21 must be used for mounting the table/desk 1 upon a structural component of a wheelchair. Further, orifices 206, 207 are a means of inserting fasteners to attach the right side-panel 24 to the Tee handle 45 of the Tee 44 of the expandable base plate 3.

It is to be understood that fastening and attachment of the various components of the table/desk 1 can be accomplished by other means, without the use of orifices to accommodate screws or bolts, including, but not limited to, welding, adhesive, clamps, and other practical fastening methods.

FIG. 5A displays a view of the upper edge 25 of the right side-panel 24, further showing the location of the right countersunk hub 6(*a*) and various orifices enabling the connection of the right side-panel 24 to the base plate 3, to a right vertical brace 28, or if necessary, connection to a right canopy clamp 30.

FIG. 6 illustrates a comprehensive layout of the bottom surfaces and means of connection of the components of an embodiment of the table/desk 1. The embodiment shown is capable of attachment to the armrests of a wheelchair. The view of FIG. 6 shows the connection of a left canopy clamp 40 fastened to the exterior wall of a left side-panel 34 and a right canopy clamp 30 fastened to the exterior wall of the right side-panel 24.

The right canopy clamp 30 and left canopy clamp 40 are manufactured from a pliable, semi-rigid material. To render the device operative, a user flexes the outer lengths 40(*c*), 30(*c*) of the left and right canopy clamps 40, 30 inwardly, thereby creating a slight clasping force upon the respective left and right armrests of a wheelchair so equipped.

FIG. 6 also demonstrates the operation of the two-unit base plate 3, which functions as a lateral adjustment mechanism, comprising a receptor plate 41 and its compatible Tee 44. FIG. 6 shows the left side-panel 34 and right side-panel 24 at close to their maximum lateral separation, the Tee 44(*b*), 44(*c*) having been extracted from the receptor plate legs 41(*a*), 41(*b*) as far as structurally possible. This extraction causes the Tee handle 45, affixed to the right side-panel 24, to push the right side-panel 24, thereby causing a separation from the left side-panel 34.

The cylindrical shaft assembly 4 is also visible in FIG. 6, further showing one end of the left rod 5 nestled in the left countersunk hub 5(*a*) and the outer end of the right rod 6, nestled in the right countersunk hub 6(*a*). Further, a retaining fastener 18 fastens the tube 4 of the cylindrical shaft assembly 4 to the undersurface 11(*b*) of the tray 11.

The retaining fastener 18 forces the linear tube 4 to remain stationary when a user moves the surface of the tray 11 to an angled tilt away from the left and right side-panels 34, 24.

This causes the left and right countersunk hubs 5(*a*), 6(*a*) to move simultaneously in circular rotations about the left rod 5 and right rod. 6. This rotation can be more readily understood by viewing both FIG. 2 and FIG. 12.

FIG. 6 shows both ends of the linear tube linearly displaced from their normal nestling within the right countersunk hub 6(*a*) and left countersunk hub 5(*a*), however, the ends of the right and left rods 6, 5 remain embedded in the respective countersunk hubs 6(*a*), 5(*a*). A length of elastic band 10 is attached to the outward ends of both the left rod 5 and right rod 6. The elastic band 10 helps produce a smooth, gradual extraction of the Tee 45 from the channel 42 of the receptor plate 41 when a user needs to accommodate the width of various sizes of wheelchairs.

FIG. 7 is a view of the receptor plate 41, showing its left leg 41(*a*), right leg 41(*b*), receptor head 41(*c*), and the plate channel 42. In actual operation of the table/desk 1, the receptor plate 41 and Tee 44 (shown in FIG. 8) function as a two-unit base plate 3, giving the capability to laterally expand the desk/table 1 to fit differing widths of wheelchairs. The receptor head 41(*c*) is fixedly attached to left side-panel 34 with fasteners through orifices 100 and 101, while the Tee handle 45 is affixed to the right side-panel 24 by fasteners inserted through orifices 200, 201 of the right side-panel 24 (ref. FIG. 5).

As discussed, with reference to FIG. 6, lateral adjustment of the table/desk 1 is accomplished by placing slight outward pressure on the right and left side-panels 24, 34. This pressure forces withdrawal of a certain length of Tee handle 45 stem 44(*a*) from its storage within the receptor plate 41 channel 42 (indicated by broken lines in FIG. 6).

FIG. 7A is an end view of the receptor head 41(*c*) of FIG. 7. FIG. 7B is an outer surface view of a planar, large shield 47 secured to the upper surface of the receptor plate 41 to protect against inadvertent contact or foreign matter entering the plate channel 42.

A perspective view of the outer surface of the Tee 44 component of the two-unit base plate 3 is shown in FIG. 8. Specifically shown are the Tee handle 45, the Tee stem 44(*a*), which includes its left branch 44(*b*) and right branch 44(*c*), the Tee end 44(*d*), and the Tee slot 46. To obtain the smallest lateral dimension of the base plate 3, the entirety of the Tee 44 must be inserted into the plate channel 42 of the receptor plate 41. A vertically-oriented guide screw 49 (visible in FIG. 6), helps maintain accurate tracking of the slot 46 as the Tee 44 is positioned in and/or out of the receptor plate 41.

FIG. 8A is a planar view of the outer surface of a small shield 48 which is secured to the upper segment of the Tee 44 for protection from contamination or inadvertent contact. The small shield 48 has dimensions, from front-to-back, compatible with the large shield 47. FIG. 6 presents a clearer illustration of the function of both shields 47, 48.

FIG. 9 illustrates a direct view of the outer surface 28(*b*) of a right vertical brace 28, which also is the identical construction of a left vertical brace 38. Each vertical brace, 28, 38 serves to connect the left and right side-panels 34, 24 to the left chair mount 31 and right chair mount 21, respectively. The chair mounts 31, 21 must be used with wheelchairs having no armrests. In this manner, the chair mounts 31, 21 enable attachment of the table/desk 1 to an accessible structural component of the wheelchair, by use of two saddles 7 and attached clamps 8 (more clearly illustrated in FIG. 2).

FIG. 9A depicts a side view of the right/left vertical brace 28, 38 of FIG. 9, further showing the orifices that may be used for fasteners to connect the right/left vertical brace 28, 38 to the right side-panel 24 or left side-panel 34, respectively. The vertical braces 28, 38 also connect to the right chair mount 31 and left chair mount 21 of the table/desk 1. Orifices 301, 302, and 303 may be used for insertion of fasteners through the vertical brace 28, 38 in order to make any necessary connections. It is to be noted that none of the orifices described in this disclosure are required for construction of the table/desk 1, as the structural components may be affixed or coupled to one another by means such as, but not limited to, welding, adhesive, clamps, and other practical fastening methods.

FIG. 9B is a downward-looking view of the top surface of the right, or left, vertical brace 28, 38.

FIG. 10 is a perspective view of the angle adjuster 2, used to support the undersurface 11(*b*) of the tray 11 at varying angles of tilt. The angle adjuster 2 is a rectangular block with four perimetral edges being a first edge 2(*b*), a second edge 2(*c*) a third edge 2(*d*), and a fourth edge 2(*e*). Its front surface 2(*f*) shows the location of an off-center through-orifice 2(*g*) which supports an axle 2(*a*). The axle 2(*a*), which may be a screw or solid rod, is inserted through the off-center orifice 2(*g*) and is affixed into the front edge of the receptor plate 41 (base plate 3). This arrangement allows the angle adjuster 2 to be rotated to position any of its perimetral edges 2(*b*), 2(*c*), (2(*d*), or 2(*e*) directly under the front surface 11(*b*) of the tray 11. Positioning any of the perimetral edges allows varied angles of tilt of the tray 11, as illustrated in FIG. 1 and FIG. 3.

FIG. 10A illustrates a direct planar view of the front face 2(*f*) of the angle adjuster 2, the relative positioning of its perimetral edges, and the off-center orifice 2(*g*).

FIG. 11 is a planar view of the top surface 11(*a*) of the tray 11 and its rearward-located flange 13. The flange 13 allows a user to arrange loose papers, pencils, or other items without the inconvenience of the items sliding off the tray 11. FIG. 11A is a profile view of the right side of the tray 11, showing the tray undersurface 11(*b*) and flange 13.

FIG. 12 and FIG. 12A are perspective views of the components of the cylindrical shaft assembly 4, being a linear tube 4(*a*) and two cylindrical rods 5, 6 which, operationally, are arranged end-to-end within the linear tube 4(*a*). Further shown is the access hole 4(*b*) through which a retaining fastener 18 affixes the linear tube 4(*a*) to the rear undersurface 11(*b*) of the tray 11.

FIG. 12A shows the left rod 5 and right rod 6, both rods shown connected, linearly, and concentrically, by an elastic band 10. Each end of the elastic band 10 is connected to the respective outer end of the left rod 5 and right rod 6. The assembly of the left and right rods 5, 6, along with the elastic band 10 is placed inside the linear tube 4(*a*). In this manner, the respective left ends of the cylindrical shaft assembly 4 are nestled within the left countersunk hub 5(*a*) of the left side-panel 34 and the respective right ends are housed within the right countersunk hub 6(*a*) of the right side-panel 24.

The elastic band 10 permits gradual widening of the distance between the left side-panel 34, and the right side-panel 24 table/desk 1 when a user slides the Tee 44 outward from the channel 42 of the receptor plate 41. During this extension, the ends of the linear tube 4(*a*) will leave their docked position inside the left and right countersunk hubs 5(*a*) 6(*a*), while the ends of the rods 5, 6, will remain within the respective countersunk hubs 5(*a*), 6(*a*). This configuration is more clearly shown in FIG. 6.

Preferred embodiments of the present inventive method having been shown and disclosed herein, it will be obvious to those persons skilled in the art that such disclosures are presented as examples only, and not as limiting the scope of this inventive concept. Numerous variations, changes, and substitutions may occur or be suggested to those skilled in the art without departing from the intent, and scope of this inventive concept, and useable on a wide variety of wheelchairs. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

The invention claimed is:

1. A portable, table/desk device for removable attachment to various-sized wheelchairs, comprising:
- (a) a left side-panel and a right side-panel, each being a solid, rectangular cuboid, each side-panel arranged vertically, side by side, with the interior-facing walls parallel to each other;
- (b) a horizontally-oriented, laterally-adjustable base plate having its left edge orthogonally affixed to the interior wall of the left side-panel and its right edge orthogonally affixed to the interior surface wall of the right side-panel;
- (c) a vertically tiltable tray comprising a top surface, an undersurface, a rear edge, and a front edge, the rear undersurface of the tray joined to a cylindrical shaft assembly, wherein
- (i) the left end of the shaft assembly is rotatably embedded within a countersunk hub fabricated in the interior wall of the left side-panel and (ii) the right end of the shaft assembly is rotatably embedded within a countersunk hub in the interior wall of the right side-panel; and
- (d) a means for securing the left side-panel and the right side-panel to the left side and right side, respectively, of a wheelchair.

2. The table/desk of claim 1, wherein the laterally-adjustable base plate comprises a two-piece unit comprising:
- (a) a receptor plate having a U-shaped contour, the U-contour forming a receptor head, a left edge, a right edge, and a plate channel;
- (b) a plate Tee, comprising a Tee handle, a Tee stem with a first branch, a second branch, a slot, and a Tee end, the stem slidably insertable, into the plate channel;
- (c) the receptor plate attached at its head to the interior surface of the left side-panel, and the Tee attached at its handle to the interior surface of the right side-panel; whereby,
- (d) sliding the Tee stem in and out of the plate channel changes the dimension between the left side-panel and the right side-panel, accommodating different widths of wheelchairs.

3. The adjustable table/desk of claim 1, wherein an angle adjuster further comprises:
- (a) a rectangular cuboid having four perimetral edges, a front surface, and a back surface;
- (b) an off-center, through-orifice in the front surface, through which an axle is inserted and imbedded into the front edge of the base plate; such that,
- (c) rotational positioning of the angle adjuster about the axle enables one perimetral edge to be in parallel abutment to the undersurface of the tray, thus varying the tilt of the tray.

4. The adjustable table/desk of claim 1, wherein the means of securing its right and left side-panels to a wheelchair comprises a right chair mount and an identical left chair mount, each comprising:
- (a) a structure having a general contour similar to a tennis racket, (i) being of the same material and thickness as the corresponding side-panel, and (ii) having an upper edge, a front edge, bottom edge, an inside surface, an outside surface, and a right/left flat;
- (b) the upper edge of each chair mount built to abut flush with its corresponding side-panel lower edge and extend a distance, equal to the length of the side-panel, beyond the rear edge of each respective side-panel, thus forming an extension arm;
- (c) a vertical brace mutually jointly attached to both the plane of the inside surface of each chair mount and the interior surface of its corresponding side-panel;
- (d) a semi-circular saddle attached to the bottom edge of each chair mount, in conjunction with a flexible, fastenable strap bonded to the outer surface of the saddle;
- (d) a flexible cord inserted through an orifice at the rear of each extension arm; wherein
- (b) each chair mount extends vertically below its respective side-panel, enabling attachment of each chair mount to a structural part of the wheelchair, using the left and right saddles, flexible straps, and cords.

5. The adjustable table/desk of claim 1, wherein the means of securing its right and left side-panels to the armrests of a wheelchair comprises:
- (a) a left canopy clamp, being of semi-rigid composition and having (i) a length longer than the left side-panel, (ii) the cross-sectional profile of an inverted letter "J," wherein the innermost leg of the profile consists of a lengthwise, straight segment, (iii) the opposite, outermost leg of the profile consists of a lengthwise segment having an inward curvilinear bend, and (iv) both segments are integrally united by a lengthwise cap;
- (b) a right canopy clamp, being of semi-rigid composition and having (i) a length longer than the right side-panel, (i) the cross-sectional profile of an inverted "U," wherein the innermost leg of the profile consists of a lengthwise, straight segment and the opposite, outermost leg of the profile consists of a lengthwise segment having an inward curvilinear bend, and (iii) both segments integrally joined by a lengthwise cap;
- (c) the innermost leg of the left canopy clamp, with its cap facing upwards, affixed to the exterior surface of the left side-panel; and
- (d) the innermost leg of the right canopy clamp, with its cap facing upwards affixed, by fasteners or other means, to the exterior surface of the right side-panel; wherein
- (e) an outward flexing of each respective canopy clamp enables the pliable grasp of each canopy clamp onto a portion of the respective left and right armrests of the wheelchair.

6. The table/desk device of claim 1 wherein the device may be placed in a "compacted mode" with the undersurface of the tray positioned flush against the upper edges of the right and left side-panels and the base plate moved laterally into its smallest lateral dimension.

7. A portable, laterally and vertically adjustable table/desk 1 device having interchangeable structural components which enable temporary attachment of the device to wheelchairs, the table/desk comprising:
- (a) a left side-panel and a right side-panel each being a solid, rectangular cuboid having a circular countersunk hub constructed on the interior surface of each respective side-panel;

(b) a laterally-adjustable base plate, the base plate being orthogonally attached at its left edge and right edge to the interior surfaces of the left and right side-panels, respectively;

(c) an angle adjuster rotatably attached to the front edge of the base plate;

(d) a tiltable, rectangular tray having a top surface, an undersurface, a rear edge, a rear flange, and a front edge, such that, with the table/desk compacted, the undersurface of the tray is parallel to, and abuts the upper edges of both the left side-panel and right side-panel;

(e) a "shaft assembly," comprising (i) a linear tube, its left and right end nestled within the respective left and right countersunk hubs, (ii) the exterior of the tube joined to the undersurface of the tray; (iii) identical left and right rods, placed end-to-end within the linear tube, and (iv) an elastic band connecting the outer ends of each rod; and (f) a means for securing the left side-panel and the right side-panel to the respective left side and right sides of a wheelchair.

8. The table/desk 1 of claim 7, wherein the laterally-adjustable base plate comprises a two-piece unit comprising:

(a) a receptor plate having a U-shaped contour, the U contour forming a receptor head, a left edge, a right edge, and a plate channel;

(b) a plate Tee, comprising a Tee handle, a Tee stem having a first branch, a second branch, a slot, and a Tee end, the stem slidably insertable, into the plate channel;

(c) the receptor plate attached at its head to the interior surface of the left side-panel, and the Tee attached at its handle to the interior surface of the right side-panel; whereby, (d) sliding the Tee stem in and out of the plate channel changes the dimension between the left side-panel and the right side-panel, accommodating different widths of wheelchairs.

9. The adjustable table/desk of claim 7, wherein the angle adjuster further comprises:

(a) a rectangular cuboid having four perimetral edges, a front surface, and a back surface;

(b) an off-center, through-orifice in the front surface, through which an axle is inserted and affixed into the front edge of the base plate; such that, (c) positioning of the angle adjuster about the axle enables one perimetral edge to be in parallel abutment to the undersurface of the tray, thus varying the tilt of the tray.

10. The adjustable table/desk of claim 7, wherein the means of securing its right and left side-panels to a wheelchair comprises a right chair mount and an identical left chair mount, each chair mount comprising:

(a) a structure having a general contour similar to a tennis racket, (i) being of the same material and thickness as the corresponding side-panel, and (ii) having an upper edge, a front edge, bottom edge, an inside surface, an outside surface, and a right/left flat;

(b) the upper edge of each chair mount built to abut flush with its corresponding side-panel lower edge and extend a distance, equal to the length of the side-panel, beyond the rear edge of each respective side-panel, thus forming an extension arm;

(c) a vertical brace mutually jointly attached to both the plane of the inside surface of each chair mount and the interior surface of its corresponding side-panel;

(d) a semi-circular saddle attached to the bottom edge of each chair mount, in conjunction with a fastenable strap bonded to the outer surface of the saddle;

(d) a flexible cord inserted through an orifice at the rear of each extension arm; wherein (b) each chair mount extends vertically below its respective side-panel, enabling attachment of each chair mount to a structural part of the wheelchair, using the left and right saddles, flexible straps, and cords.

11. The adjustable table/desk of claim 7, wherein the means of securing its right and left side-panels to the armrests of a wheelchair comprises:

(a) a left canopy clamp, being of pliable composition and having (i) a length longer than the left side-panel, (ii) the cross-sectional profile of an inverted letter "J," wherein the innermost leg of the profile consists of a lengthwise, straight interior segment and the opposite, outermost leg of the profile consists of a lengthwise segment having an inward curvilinear bend, and (iii) both segments integrally joined by a lengthwise cap;

(b) a right canopy clamp, being of pliable composition and having (I) a length longer than the right side-panel, (ii) the cross-sectional profile of an inverted "U," wherein the innermost leg of the profile consists of a lengthwise, straight interior segment, (iii) the opposite, outermost leg of the profile consists of a lengthwise segment having an inward curvilinear bend, and (iv) both segments are integrally joined by a lengthwise cap;

(c) the interior segment of the left canopy clamp, with its cap facing upwards, affixed, by fasteners or other means, to the exterior surface of the left side-panel; and (d) the interior segment of the right canopy clamp, with its cap facing upwards affixed, by fasteners or other means, to the exterior surface of the right side-panel; wherein (e) an outward flexing of each respective canopy clamp enables the pliable grasp of each canopy clamp onto the contacted length of the respective left and right armrests of a wheelchair.

12. The table/desk device of claim 7 wherein the device may be placed in a "compacted mode" with the undersurface of the tray positioned flush against the upper edges of the right and left side-panels and the base plate moved laterally into its smallest lateral dimension.

* * * * *